United States Patent
Shimizu

[19]

[11] Patent Number: 5,848,309
[45] Date of Patent: Dec. 8, 1998

[54] FILM FEEDER FOR CAMERA AND CAMERA WITH FILM FEEDER

[75] Inventor: Tokuo Shimizu, Hachioji, Japan

[73] Assignee: Olympus Optical Co., Ltd., Tokyo, Japan

[21] Appl. No.: 803,061

[22] Filed: Feb. 20, 1997

[30] Foreign Application Priority Data

| Feb. 20, 1996 | [JP] | Japan | 8-032254 |
| Feb. 20, 1996 | [JP] | Japan | 8-032255 |
| Feb. 29, 1996 | [JP] | Japan | 8-043776 |

[51] Int. Cl.$^6$ .................................................. G03B 17/24
[52] U.S. Cl. .......................................... 396/408; 396/410
[58] Field of Search ................................... 396/406, 407, 396/408, 410, 418, 310, 319

[56] References Cited

U.S. PATENT DOCUMENTS 5,136,314  8/1992  Kazami et al. ........................ 396/408
5,251,840  10/1993  Niedospial .

FOREIGN PATENT DOCUMENTS 2-67535  3/1990  Japan .
4-125530  4/1992  Japan .
5-45801  2/1993  Japan .

*Primary Examiner*—David M. Gray
*Attorney, Agent, or Firm*—Louis Weinstein

[57] ABSTRACT

A film feeder for a camera having: a film feeding mechanism for feeding a film out of a film magazine by rotating a winding shaft, around which the film is wound, in the film magazine via a first speed reducer; and a film winding mechanism which takes up the film by rotating a film winding spool shaft via a second speed reducer; wherein the reduction ratio of the first speed reducer is at least twice as large as the reduction ratio of the second speed reducer. A camera provided with a film feeder feeds film out of a film cartridge by rotating a film cartridge spool and rewinds film into the cartridge employing: a single driving source; a driving shaft driving a winding shaft for feeding film; a film spool shaft rewinding film; a first gear train driving the driving shaft to simultaneously drive the winding shaft and the film spool shaft when the drive source rotates in one direction to feed film; and a second gear train driving the driving shaft to simultaneously drive the winding shaft and the film spool shaft when the drive source rotates in an opposite direction to rewind film; the gear ratio between the driving source and the film spool shaft in the second gear train being smaller than the gear ratio between the driving source and the driving shaft for driving the winding shaft.

10 Claims, 13 Drawing Sheets

FILM FEEDER FOR CAMERA AND CAMERA WITH FILM FEEDER

BACKGROUND OF THE INVENTION

1. Field of the Invention

The present invention relates to a camera which employs a film with a feeding function.

2. Description of Related Art

It has recently been proposed a new type of film cartridge. Unlike the conventional 135-type film cartridge, the new type is provided with a magnetic information recording section on the film surface and an end of the film of the new type is not exposed out of the cartridge. In the case of the new type of film cartridge (hereinafter referred to as "film magazine"), after the film magazine is loaded in a camera, a film winding shaft in the film magazine is rotated to feed the film.

Japanese Unexamined Patent Publication No. 4-125530 has disclosed a film feeder for a camera which employs the new type of film magazine. In the film feeder for a camera, the film winding shaft is rotated by a feeding motor and a gear train to feed the film from the film magazine at a first speed. Once the film is fed out of the film magazine, the film is wound and taken up onto a film spool shaft at a second speed which is higher than the first speed, and the feeding drive is released when the film feeder is shifted to the take-up mode.

According to the film feeder for a camera disclosed in Japanese Unexamined Patent Publication No. 4-125530, the gear ratios of respective gears are set so that the speed at which the film spool shaft takes up the film is higher than the speed at which the film winding shaft and a feeding roller feed the film. Hence, when an end of the film, which is being fed, reaches the film spool shaft, a planetary gear revolves to release the engagement between the gears for feeding the film.

According to the description in the foregoing disclosure, to rewind the film, the motor is run in the opposite direction from that for feeding and winding the film so as to revolve the planetary gear to rotate only the film winding shaft in the rewinding direction.

Japanese Unexamined Patent Publication No. 2-67535 has disclosed a film feeder for a camera which employs the film with the feeding function, wherein "one-way clutches," which transmit rotation only when rotated in one direction and do not transmit rotation when rotated in the opposite direction, are provided between the film winding shaft and a gear for driving the winding shaft and between the winding shaft and a driving gear therefor. In this film feeder, in order to allow the one-way clutches to work effectively, the reduction ratio for rewinding has been set to a larger value than that for winding, and the reduction ratio for feeding has been set to a larger value than that for the winding.

Further, in the case of the film cartridges which have been disclosed in U.S. Pat. No. 5,251,840 and Japanese Unexamined Patent Publication No. 5-45801, flanges formed using a flexible material are fitted on opposite ends of a film winding shaft in the film cartridge (hereinafter referred to as "film magazine") loaded with a photographic film, tongue-shaped projections are integrally formed on the peripheries of the flanges, and the outermost periphery of the photographic film wrapped around the film winding shaft in the film magazine is partly wrapped from both ends so as to prevent the photographic film from unrolling. Thus, when the film winding shaft in the film magazine is rotated in the feeding direction, the photographic film rotates integrally with the film winding shaft without unrolling. The foregoing projections are so designed that they are spread in the direction of the width of the photographic film in the vicinity of the photographic film slot provided on the main body of the film magazine so as to allow the photographic film to be fed through the photographic film slot.

However, the aforesaid camera film feeder disclosed in Japanese Unexamined Patent Publication No. 4-125530 poses the problems set forth below.

Firstly, the Japanese Unexamined Patent Publication No. 4-125530 does not refer to the speed at which the film is fed from the film magazine and the differences in speed of the feeding rollers at the time of feeding. The following will describe how the different speeds influence the film feed in the configurations of the foregoing related arts.

As shown in FIG. 1, a film FI fed by a spool shaft (1c) serving as the film winding shaft of a film magazine (1) is fed through feeding rollers (17) and (18); the outside diameter of the film wound around the spool shaft (1c) decreases as the film is fed further, so that the speed at which the film is fed decreases in proportion to the outside diameter of the wound film.

At this time, if the film moving speeds of the feeding rollers (17) and (18) are set faster than the film feeding speed of the spool shaft (1c), then a planetary gear (15b) revolves clockwise around a sun gear (15a) of a planetary gear assembly (15) to engage a rewinding gear (14). This causes the planetary gear (15b) to be disengaged from a gear (16), thus interrupting the feed of the film.

Conversely, if the film moving speeds of the feeding rollers (17) and (18) are set slower than the film feeding speed of the spool shaft (1c), then the film FI which has been fed by the rotation of the spool shaft (1c) of the film magazine (1) stagnates between the feeding rollers (17) and (18), causing a film jam. In the worst case, a problem, in that the film FI will be so badly jammed that the film cannot be fed, may arise.

A second problem set forth below is related to the feeding and winding route and the reduction ratios.

Specifically, at the time of feeding, the driving force of the motor is transmitted to the spool shaft (1c) via a gear train GT1, a planetary gear assembly (12), a driving gear (13), the planetary gear assembly (15), and a gear train GT3 as shown in FIG. 1.

At the time of winding, the driving force of the motor is transmitted to a film spool shaft SP, which is a winding spool, via the gear train GT1, the planetary gear assembly (12), the driving gear (13), and a gear train GT2 as shown in FIG. 2.

According to one aspect of the present invention, there is obviously the following relationship between the reduction ratio of winding and the reduction ratio of feeding from the different speeds:

Winding reduction ratio<Feeding reduction ratio

The transmitting route for feeding will now be compared with that for winding.

The planetary gear assemblies (12) and (15) are just idle gears and are not involved in the reduction ratio; therefore, the following relationship will be given: Reduction ratio of GT2<Reduction ratio of GT3 . . . (A)

The reduction ratio from a motor (11) to the sun gear (15a) until the planetary gear (15b) of the planetary gear assembly (15) is revolved in the clockwise direction of the sun gear (15a) at the time of shifting to the winding mode is determined by the route which includes the motor (11), the gear train GT1, the planetary gear assembly (12), the driving gear (13), the gear train GT2, the film spool shaft SP, the outside diameter of the film in the film magazine, the gear train GT3, and the sun gear (15*a*).

Of the above, those that are involved in the reduction ratio are the motor (11), the gear train GT1, the gear train GT2, the film spool shaft SP, the outside diameter of the film in the film magazine, the gear train GT3, and the sun gear (15*a*).

At the time of feeding, the film has not yet been wound around the film spool shaft; therefore, the relationship shown below applies at the start of feeding:

Dia. of film spool shaft<O.D. of film on film winding shaft

When the winding is nearly completed, the following relationship applies:

O.D. of film on film spool shaft>Dia. of film winding shaft

Specific numeric values will now be given for further study. For this purpose, it is assumed that the diameter of the film spool shaft is 15.5 mm, the outside diameter of the film on the film winding shaft is 17.5 mm, the outside diameter of the film on the film spool shaft is 22 mm, and the diameter of the film winding shaft is 8 mm.

When switching from the feeding mode to the winding mode, reduction ratio (i) to the planetary gear assembly (15) is obtained as follows:

$$i=17.5/15.5 \times GT1 \times GT2/GT3 = 1.13 \times GT1 \times GT2/GT3 \qquad (B)$$

Reduction ratio (i) immediately before the winding is completed will be as follows:

$$i=8/22 \times GT1 \times GT2/GT3 = 0.36 \times GT1 \times GT2/GT3 \qquad (C)$$

At this time, since the reduction ratio shown in expression (C) is smaller than that shown in expression (B), the following relationship will be derived from expression (A) and expression (C):

$$i<0.36 \times GT1 \qquad (D)$$

Normally, the friction torque of the planetary gear (15*b*) is approximately 4 g·cm when it is used as a part of the internal mechanism of a camera. It has been accepted that about 20 is an appropriate value for reduction ratio (i) in order to minimize the motor current of the friction torque. This is because, if the motor starting torque is 20 g·cm and the starting current is 2 A, and i=20, then the current consumed by the motor will be as follows:

$$(2A/(20 \times 20)) \times 4 \text{ (g·cm)} = 20 \text{ (mA)}$$

This means that the current consumed by the motor for the friction torque of 4 g·cm is 20 mA; this level of current consumed by the motor is reasonable as the current consumed by the camera.

In order to make reduction ratio (i) 20 (i=20), it is required that GT1>53.9.

If the relationship, GT2<GT3, given in expression (A) above is defined as GT2<GT3=2GT2, then GT1>107.

And if GT2 and GT3 are set more specifically as GT2=50 and GT3=2GT2=100, then the following reduction ratio is given from expression (C) above at the time of feeding:

$$i=0.36 \times GT1 \times GT2/GT3 = 0.36 \times 107 \times 50/100 = 19.3$$

This means that gears having relatively high reduction ratios are required for GT1, GT2, and GT3, which inevitably takes up a large space in a camera.

Referring to a first embodiment and a second embodiment of Japanese Unexamined Patent Publication No. 4-125530, a third problem will be described.

The first embodiment does not have a "self-resetting" structure, shown in FIG. 1 through FIG. 4, for retaining the engagement of the planetary gear assembly (15) with the winding gear at the time of rewinding or for shifting the planetary gear assembly (15) to the feeding direction when the operation is switched from the rewinding mode to the feeding mode. Hence, the first embodiment needs and employs a plunger serving as the second drive source for shifting the planetary gear assembly (15) in the feeding direction.

In the second embodiment, in order to eliminate the plunger serving as the second drive source, a cam-like engagement hole and a boss are used to connect planetary gears (62*b*) and (65*b*) of two planetary gear assemblies (62) and (65), respectively, and they are urged by a spring (70) as illustrated in FIG. 5 and FIG. 6. This involves a complicated configuration of the engagement hole and a pin and the need of the connection, restricting the location where the planetary gear assembly may be disposed.

Thus, the first embodiment and the second embodiment disclosed in Japanese Unexamined Patent Publication No. 4-125530 pose such problems as the need for a second drive source for resetting the planetary gear assembly to its home position or a complicated configuration due to the complicated cam-like engagement hole and a boss for connecting the two planetary gear assemblies to obviate the need for the second drive source.

These related arts do not disclose a method for preventing an automatic film loading error or for achieving successful magnetic recording on a frame at an end of a roll of film.

Further, in these embodiments, the revolution of the motor, which is a driving source, is not transmitted to the winding spool and the feeding roller when rewinding the film. Therefore, the winding spool remains engaged with the film during rewinding, and the winding spool is rotated in the rewinding direction by the tensile force produced when the film is rewound, meaning that the gear train also remains engaged with the winding spool as in the winding mode. This embodiment thus applies a large load to the film.

There has been another problem: the film is nipped between two feeding rollers with which the driving gear train remains engaged; therefore, at the time of rewinding the film, the load on the film may cause the film to break or to be scratched.

An embodiment described in Japanese Unexamined Patent Publication No. 2-67535 is provided a the one-way clutch for shifting from the film feeding mode to the film winding mode. Further, the reduction ratios are set such that the one-way clutch is relatively reversed according to speed differences so as to prevent any unwanted driving force from being transmitted. No consideration, however, has been given to prevent automatic film loading failures.

Referring now to FIG. 7 and FIG. 8 illustrating an embodiment of the present invention, the actual automatic film loading process which includes the switching from the film feeding mode to the film winding mode will be described.

The following will describe ideal automatic loading.

As shown in FIG. 7 and FIG. 8, firstly, to feed the film, an R fork gear 10 engaged with a film take-up shaft 2*a* of a film magazine 2 rotates to feed a film 1 out of a film magazine 2. A film end 1*a* passes a pressure plate 22, a photo-reflector (hereinafter referred to as "PR") 7, and a magnetic head 8 to reach a film spool shaft 12 via a film-driven roller 9, and it is wound around the film spool shaft 12 at a higher speed than the film feeding speed. Then, the first frame of the film 1 is set in a predetermined position. This completes the automatic film loading.

The foregoing automatic film loading is ideal, whereas some problems arise in actual automatic film loading before it is completed. The following will describe the problems that are likely to take place before the automatic film loading is completed.

As shown in FIG. 7 and FIG. 8, at the time of feeding the film, the end 1a of the film 1 fed out of the film magazine 2 must pass the pressure plate 22 which is provided in a narrow gap to secure the flatness of the film relative to a camera main body 25 and the magnetic head 8 for recording magnetic information on a magnetic layer which is the magnetic information recording section provided on the film 1.

The magnetic head 8 is equipped with a pad 23 for securing close contact with the magnetic layer of the film 1; a spring 24 is provided at the rear of the pad 23 to press the pad 23 against the magnetic head 8.

Further, the film-driven roller 9 functions to convert the film travel amount into the number of pulses; a spring 26 is provided at the rear of the film-driven roller 9 to urge the film 1.

Thus, the film 1 fed out of the film magazine 2 is subject to drag every time it passes the pressure plate 22, the magnetic head 8, the film-driven roller 9, etc., so that it is gradually decelerated toward the film spool shaft 12.

There is a slight time lag until the film end 1a of the film 1 fed out of the film magazine 2 reaches the film spool shaft 12 and winds around the film spool shaft 12 so that it is taken up by the film spool shaft 12.

Despite the time lag which takes place from the moment the film reaches the film spool shaft to the moment the film is taken up, the fork gear 10 engaged with the film take-up shaft 2a continues to rotate in the film feeding direction. Hence, the film 1 in the film magazine 2 behaves as if it were a spiral spring, and when the film feeding mode is switched to the film winding mode, excessive film feed takes place in the film magazine 2.

At this time, unless the excessive film feed in the magazine is quickly absorbed by the film spool shaft 12, the film 1 cannot be wound around the film spool shaft 12, leading to a failure of automatic film loading. And even if the film 1 is wound around the film spool shaft 12, the excessive feed of the film 1 in the film magazine 2 tends to cause unstable film feeding speed during the film feed because the torque of the film spool shaft 12 taking up the film and the torque of the film take-up shaft 2a responsible for film feed are both applied to the film 1. Thus, there has been a danger of unstable recording density for magnetic recording or magnetic recording errors which occur in an area from about the first frame to about the fifth frame on the film end.

SUMMARY OF THE INVENTION

Accordingly, a first object of the present invention is to provide a film feeder for a camera which permits space saving in configuring a camera.

A second object of the present invention is to provide a film feeder for a camera which permits smooth shift from film feeding to film winding without using feeding rollers, minimizes the current consumed by a motor for winding film, and accomplishes a simpler configuration by reducing the number of parts constituting the mechanism for self-resetting to a home position so as to enable smooth film feeding after the film is rewound, thus achieving higher reliability.

A third object of the present invention is to provide a film feeder for a camera which permits smooth, reliable shift from film feeding to film winding and which also permits stable magnetic recording in the magnetic information recording area of the frames at an end of film.

A fourth object of the present invention is to provide a film feeder for a camera which minimizes the load applied to film when rewinding the film so as to prevent the film from being broken or scratched.

In brief, the film feeder of the camera according to the present invention is equipped with: a film feeding mechanism for feeding a film out of a film magazine by rotating a winding shaft, around which winding shaft the film has been wound, in the film magazine via a first speed reducer; and a film winding mechanism which takes up the film by rotating a film winding spool shaft via a second speed reducer; wherein the reduction ratio of the first speed reducer of the film feeding mechanism is set twice as large as the reduction ratio of the second speed reducer of the film winding mechanism.

A camera provided with a film feeder which has a function for feeding a film out of a film cartridge by rotating a spool in the film cartridge and for rewinding the film into the cartridge is equipped with: a single driving source; a driving shaft for driving a winding shaft for feeding the film; a spool shaft for rewinding the film; and a first gear train for driving the driving shaft for driving the winding shaft and the spool shaft at the same time as the driving source runs in one direction so as to feed the film; and a second gear train for driving the driving shaft for driving the winding shaft and the film spool shaft at the same time as the driving source runs in the other direction so as to rewind the film; wherein the gear ratio between the driving source and the film spool shaft in the second gear train is set smaller than the gear ratio between the driving source and the driving shaft for driving the winding shaft.

BRIEF DESCRIPTION OF THE DRAWINGS

FIG. 1 through FIG. 6 are explanatory diagrams of a configuration example of a film feeder; wherein FIG. 1 is a diagram showing a film which is being fed;

FIG. 2 is a diagram showing the film which is being wound;

FIG. 3 is a diagram showing the film which is being rewound; and

FIG. 4 is a diagram showing a state wherein the rewinding of the film has been completed;

FIG. 5 and FIG. 6 are explanatory drawings of other configuration examples of the film feeder; wherein FIG. 5 is a diagram showing the film which is being fed; and FIG. 6 is a diagram showing the film which is being wound;

FIG. 7 through FIG. 16 are diagrams illustrating an embodiment of the present invention, wherein FIG. 7 is a diagram schematically showing the configuration of a camera;

FIG. 8 is a diagram schematically showing the configuration of a film feeder for a camera;

FIG. 9 is a sectional view illustrating a film in contact with a film-driven roller;

FIG. 10 through FIG. 13 illustrate the configuration of a film feeder which enables a single motor to perform four divisional drive, wherein FIG. 10 is a diagram illustrating the film which is being fed;

FIG. 11 is a diagram illustrating the film which is being wound;

FIG. 12 is a diagram illustrating a lens is being driven; and

FIG. 13 is a diagram illustrating the film which is being rewound;

FIG. 14 is a diagram showing the configuration of a lens drive cam position detector;

FIG. 15 is a diagram showing the film, an end thereof being in a film magazine; and FIG. 16 is a diagram showing the film, the end thereof being fed out of the film magazine.

DETAILED DESCRIPTION OF THE PREFERRED EMBODIMENTS

Referring now to FIG. 7 through FIG. 16, an embodiment of the present invention will be described.

Figure 1:
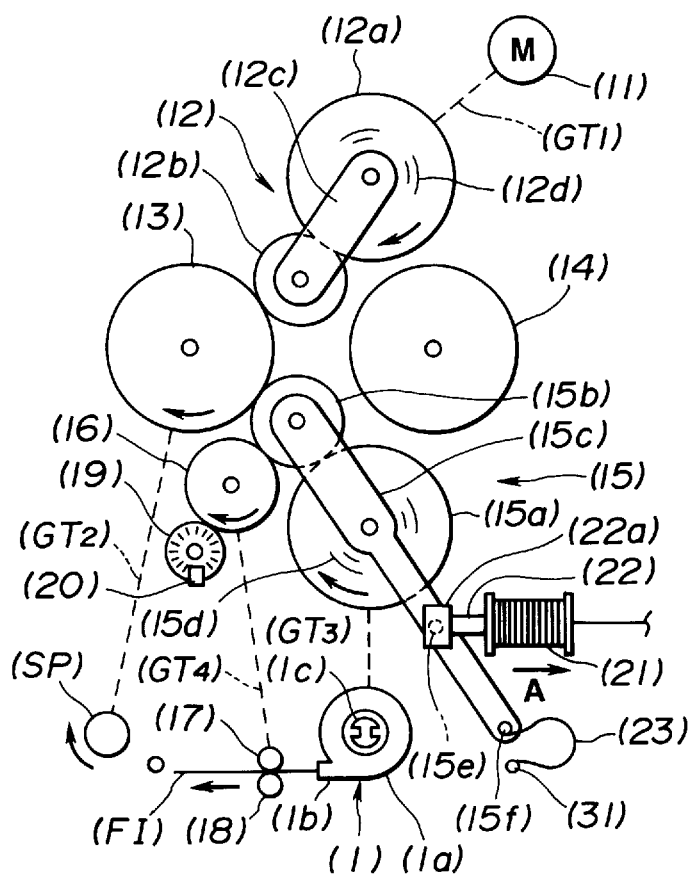
Figure 2:
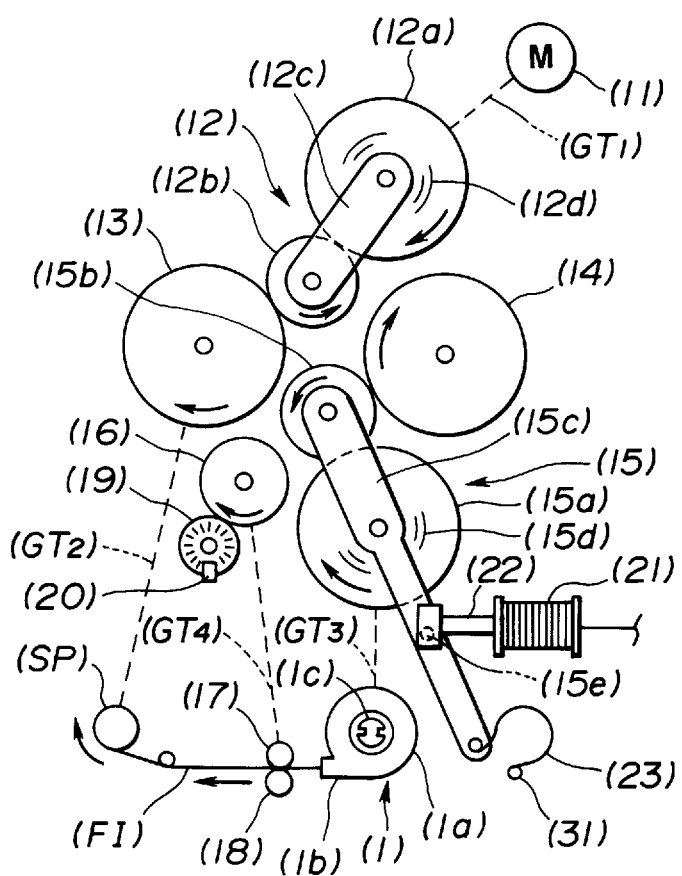
Figure 3:
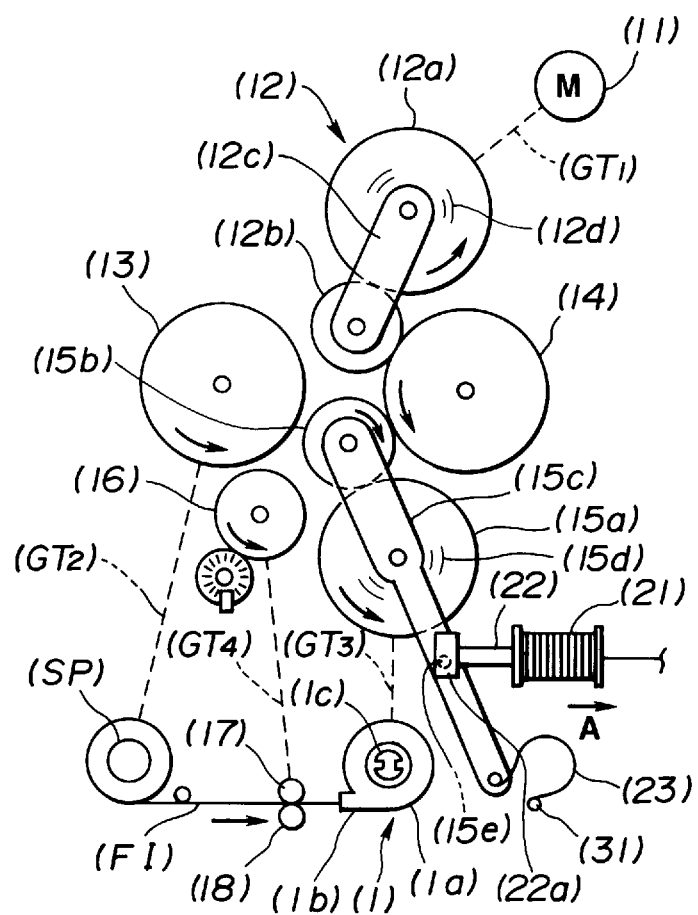
Figure 4:
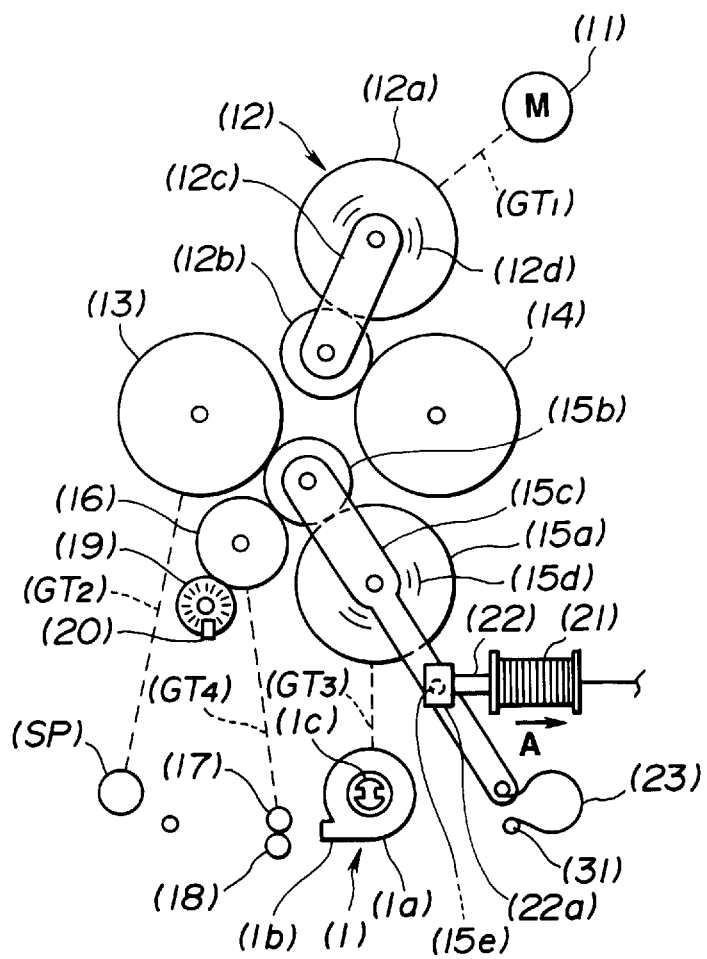
Figure 5:
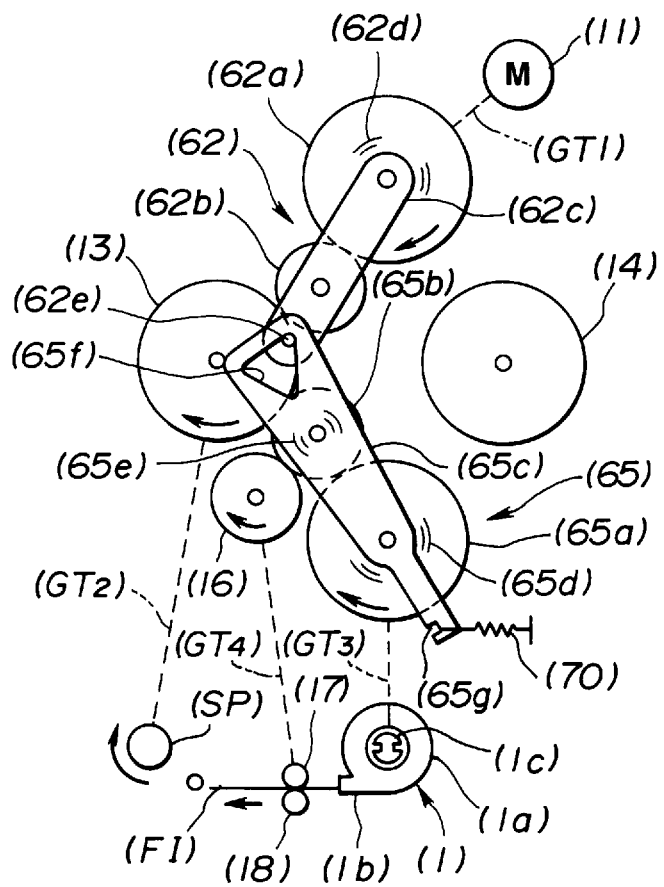
Figure 6:
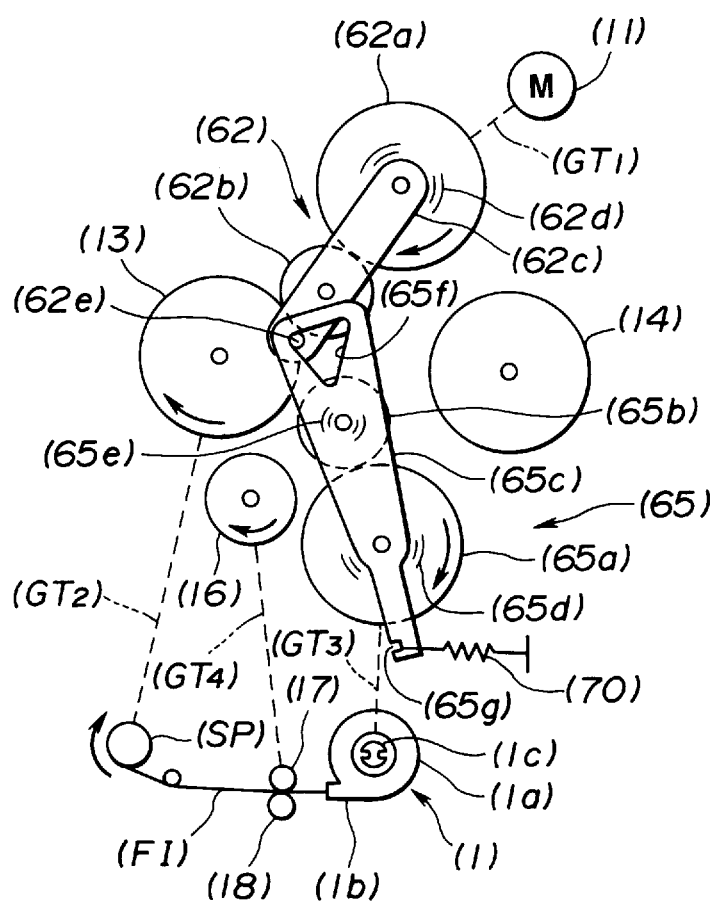
Figure 7:
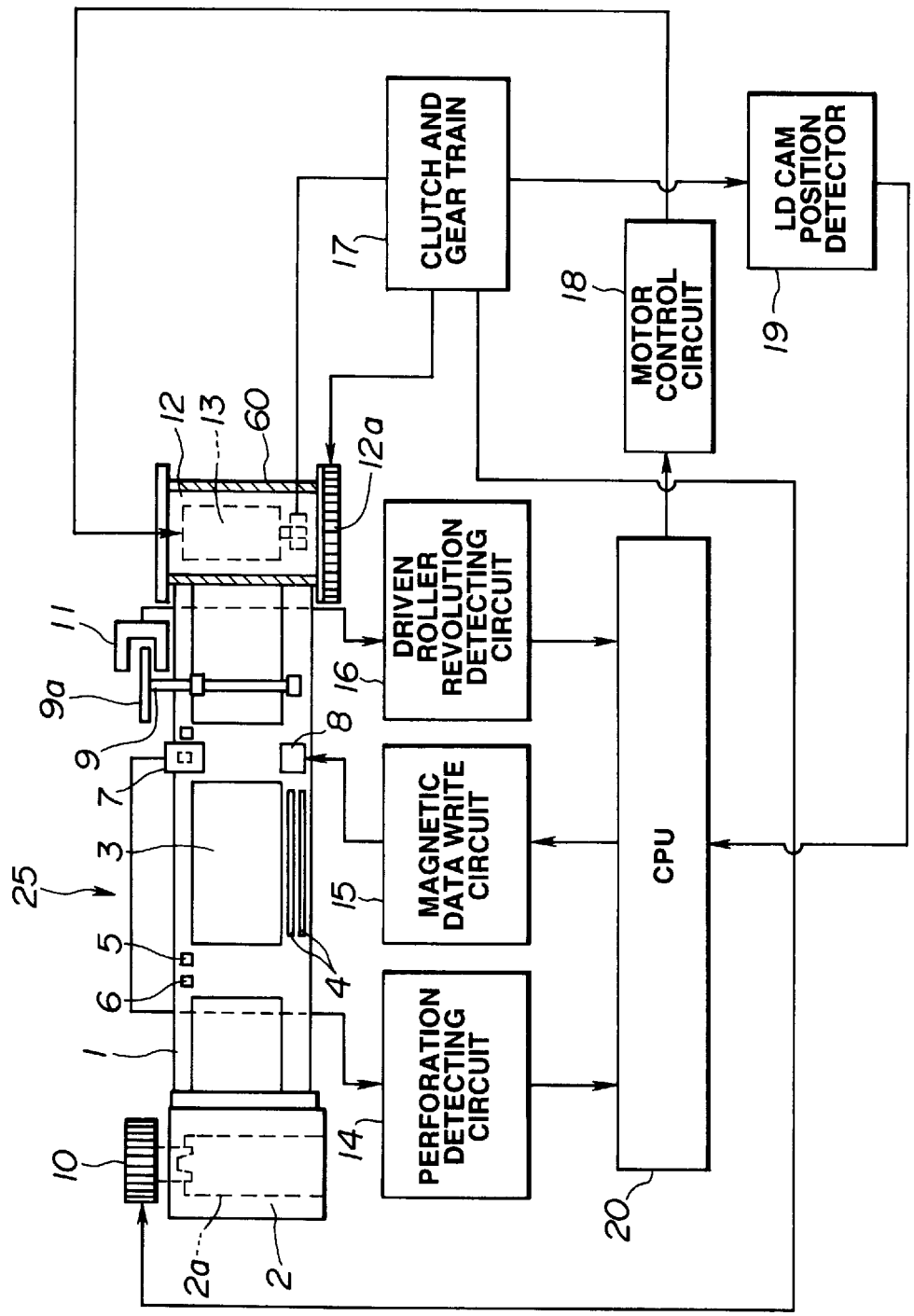
Figure 8:
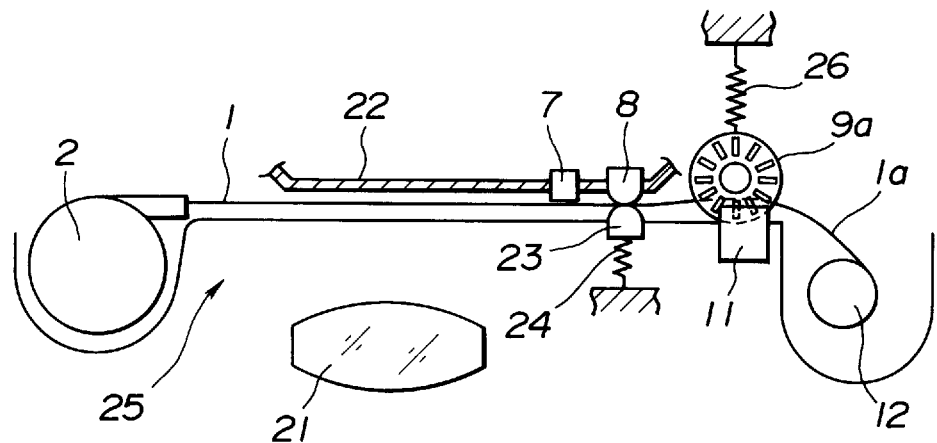
Figure 15:
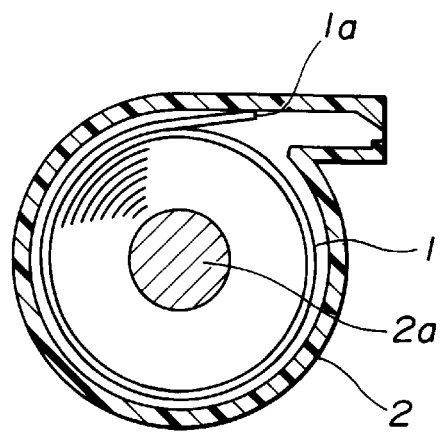

As shown in FIG. 7 and FIG. 8, a film 1 provided in a camera 25 is fed out of a film magazine 2 by a film feeder which will be discussed later; each photographic frame 3 of the film 1 is provided with a magnetic track 4 serving as a magnetic information recording section to which information such as photographed date and photographing conditions, for example, is recorded, and two perforations 5 and 6. When the film magazine 2 is placed in the camera 25, a film end 1a of the film 1 in the film magazine 2 is positioned in the magazine as shown in FIG. 15.

Figure 16:
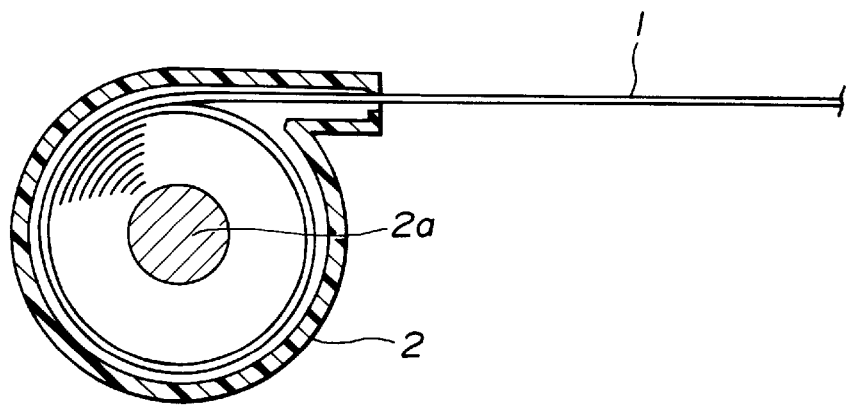

A film winding shaft 2a is provided in the film magazine 2, the film 1 being wound around the film winding shaft 2a. When the film magazine 2 is placed in the camera 25, a fork gear 10 constituting the film feeder engages with one end of the film winding shaft 2a. As the fork gear 10 rotates, for example, clockwise as shown in FIG. 8, the film 1 in the magazine is fed out of the magazine as shown in FIG. 16. The fork gear 10 may be rotated counterclockwise, i.e., in the opposite direction from above, to wind the film 1, which has been fed out of the magazine, back into the magazine.

The film 1 which has been fed out of the magazine 2 passes a pressure plate 22 and a photographic screen section (not shown) in the pressure plate, and further passes a magnetic head 8, which is provided with a magnetic data write circuit 15, via a photo-reflector (hereinafter referred to as "PR") 7 connected to a perforation detecting circuit 14, then passes a film-driven roller 9 which rotates as the film 1 moves, before it reaches a film spool shaft 12 constituting the film winding mechanism.

Figure 9:
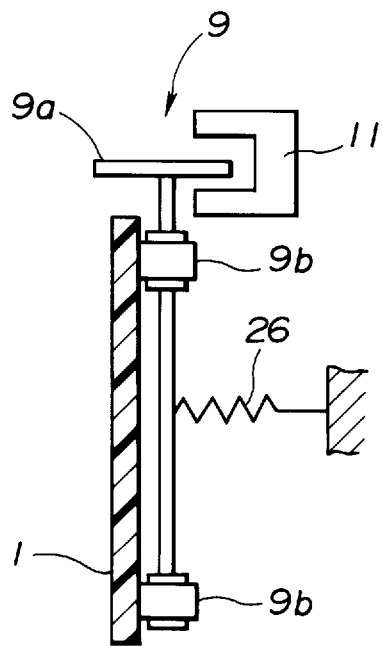

As illustrated in FIG. 9, the film-driven roller 9 is equipped with a pulse generating comb-like section 9a and a pair of rollers 9b which respectively come in contact with the upper outer surface and the lower outer surface of the photographic frame 3 of the film 1. Provided on the pulse generating comb-like section 9a is a photo-interrupter (hereinafter referred to as "PI") 11 connected to a driven-roller revolution detecting circuit 16; the pulse generating comb-like section 9a converts the film travel amount into a number of pulses. A spring 26 urges the rollers 9b of the driven roller 9 such that they are brought in close contact with the film 1 so as to ensure smooth rotation of the driven roller 9.

When the film 1, which has passed the film-driven roller 9, reaches the film spool shaft 12, the film end 1a is wound around the film spool shaft 12, then a clutch and gear train 17 is switched from a film feeding mode to a film winding mode as it will be discussed later so as to wind the film 1 around the film spool shaft 12.

Provided in the film spool shaft 12 is a motor 13 serving as a driving source for film feeding, film winding, film rewinding, and a lens drive (hereinafter referred to as "LD") for moving an autofocus photograph lens 21. The motor 13 is run in the forward direction or the reverse direction to switch the clutch and gear train 17 over to a feeding and winding gear train or a rewinding gear train so as to feed and wind the film or rewind the film, or switch to the LD drive for autofocusing.

The motor 13 is connected to a motor control circuit 18. The area of the film spool shaft 12 where the film comes in contact is covered with a rubber tube 60 to allow the film 1 to be easily wound around the shaft. Further, a CPU 20 is connected to the perforation detecting circuit 14, the magnetic data write circuit 15, the driven-roller revolution detecting circuit 16, the motor control circuit 18, and an LD cam position detector 19.

As shown in FIG. 10 through FIG. 13, in the camera 25, primarily the clutch and gear train 17 is constituted by:

- a clutch mechanism composed of a clutch sun gear 27, which is driven by the motor disposed on the film spool shaft 12 end, and a clutch planetary gear 28 which engages with the clutch sun gear 27 and revolves;

- a second planetary gear mechanism which employs, as a second sun gear, the fork gear 10 engaged with one end of the film winding shaft 2a, and constitutes the film feeding mechanism by a second planetary gear 39 which engages the fork gear 10 and revolves and the fork gear 10;

- a transmitting gear train composed primarily of a first gear 29, a second gear 30, a WR idler 31, a first transmitting gear 32, a second transmitting gear 33, a third transmitting ger 34, a fourth transmitting gear 35, a fifth transmitting gear 36, a sixth transmitting gear 37, and a transmitting planetary gear 38 serving as a first planetary gear, which transmit the driving force of the motor 13 to the film winding shaft 2a via the film spool shaft 12, which winds the film 1 through the clutch mechanism, and the fork gear 10; and

- an LD gear train composed of a first LD transmitting gear 41 and a second LD transmitting gear 42 which rotate an LD cam gear 43 controlling the movement of an autofocus photograph lens 21.

The driving force of the motor 13 is transmitted to the film spool shaft 12 and the film winding shaft 2a through the engagement between the planetary gear 28 of the clutch mechanism and the first gear 29 constituting the gear train of the first reduction ratio as the first speed reducer or the first transmitting gear 32 constituting the gear train of the second reduction ratio as the second speed reducer.

Disposed between the first gear 29 and the first transmitting gear 32 is the second gear 30, which constitutes the gear train of the first reduction ratio which rotates the film spool shaft 12, and the WR idler 31 constituting the gear train of the second reduction ratio which transmits the driving force of the second gear 30 to the first transmitting gear 32.

When the planetary gear 28 is engaged with the first gear 29, the driving force of the motor 13 is transmitted to the film spool shaft 12 via the first gear 29 and the second gear 30 constituting the gear train of the first reduction ratio; and the rotation of the second gear 30 is transmitted to the film winding shaft 2a via the WR idler 31, the first transmitting gear 32, the second transmitting gear 33, the third transmitting gear 34, the fourth transmitting gear 35, the fifth transmitting gear 36, the sixth transmitting gear 37, the transmitting planetary gear 38, the second planetary gear 39, and the fork gear 10 which constitute the gear train of the second reduction ratio.

At this time, the film spool shaft 12 and the film winding shaft 2a rotate in the same direction as that of the sun gear 27 which rotates in the same direction as that of the motor 13, thereby feeding and winding the film.

When the planetary gear 28 is engaged with the first transmitting gear 32, the driving force of the motor 13 is transmitted to the film spool shaft 12 via the first transmitting gear 32, the WR idler 31, and the second gear 30; and it is also transmitted from the first transmitting gear 32 to the film winding shaft 2a via the second transmitting gear 33, the third transmitting gear 34, the fourth transmitting gear 35, the fifth transmitting gear 36, the sixth transmitting gear 37, the transmitting planetary gear 38, the second planetary gear 39, and the fork gear 10. At this time, the film spool shaft 12 and the film winding shaft 2a rotate in the opposite direction from that of the sun gear 27 which rotates in the same direction as that of the motor 13, thereby rewinding the film.

The sixth transmitting gear 37 is a sun gear (hereinafter referred to as "transmitting sun gear 37") which is driven and rotated in different directions according as whether the film is fed and wound or rewound; the transmitting sun gear 37 and the transmitting planetary gear 38 which revolves around the transmitting sun gear 37 configure the transmitting planetary gear mechanism. The transmitting sun gear 37 and the transmitting planetary gear 38 are connected by a transmitting gear arm 50.

The clutch sun gear 27 and the clutch planetary gear 28 are connected by a clutch gear arm 46; the fork gear 10 and the second planetary gear 39 are connected by a second gear arm 53.

Figure 14:
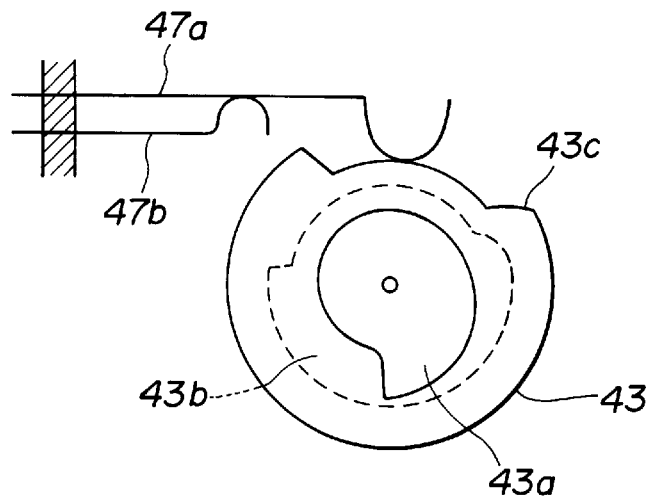

The photographing lens 21 is moved by an arm stopper cam 43b provided on the LD cam gear 43 and an arm stopper 44 which turns to follow the movement of the arm stopper cam 43a; the position of the LD cam gear 43 is determined by signals received from LD cam switches 47a and 47b of the LD cam position detector 19 which is configured as shown in FIG. 14.

Further, the fifth transmitting gear 36 located on the lower side of the camera 25 and the transmitting sun gear 37 disposed on the upper side of the camera 25 are connected by a coupling shaft 61; they are so configured that they rotate in the same direction.

Referring now to FIG. 10 through FIG. 13, the film feeding, film winding, film rewinding, and LD by the motor 13 will be described.

First, the film feeding operation will be described in conjunction with FIG. 10.

When the film magazine 2 is set in a predetermined position in the camera 25, the fork gear 10 engages with the film winding shaft 2a. Under this condition, an instruction of feeding the film 1 is given by pressing a film feed switch (not shown) provided on the camera 25.

Then, the LD cam position detector 19 determines whether an arm locking section 44a of the arm stopper 44 which follows the movement of the LD cam gear 43 has been moved to a withdrawn position. At this time, if it is determined that the arm locking section 44a has not been moved to the withdrawn position, then the motor 13 is rotated in the forward direction to revolve the clutch planetary gear 28, which engages with the clutch sun gear 27 constituting the clutch mechanism, so as to bring the clutch gear arm 46 in contact with a fixed stopper 48 to engage the clutch planetary gear 28 with the first gear 29.

The engagement between the clutch planetary gear 28 and the first gear 29 causes the forward rotation of the motor 13 to be transmitted to the clutch sun gear 27 and the clutch planetary gear 28 and further to the first gear 29 and the second gear 30 constituting the transmitting gear train so as to rotate the film spool shaft 12 engaged with the second gear 30 in the direction of the arrow; the forward rotation of the motor 13 is also transmitted from the second gear 30 constituting the transmitting gear train to the WR idler 31, the first transmitting gear 32, the second transmitting gear 33, the third transmitting gear 34, the fourth transmitting gear 35, the fifth transmitting gear 36, the coupling shaft 61, and the transmitting sun gear 37. This causes the transmitting planetary gear 38, which is engaged with the transmitting sun gear 37, to revolve to hold the first gear arm 50 against a fixed stopper 51. This in turn causes the transmitting planetary gear 38 to engage with the second planetary gear 39 constituting the second planetary gear mechanism to rotate the fork gear 10 in the direction of the arrow so as to rotate the film winding shaft 2a clockwise as shown in the drawing, thereby feeding the film 1 out of the magazine.

The film 1 fed out of the film magazine 2 reaches the film spool shaft 12 via the pressure plate 22, the photographic screen (not shown), the PR 7, the magnetic head 8, and the film-driven roller 9, and the film 1 is taken up by the film spool shaft 12 which is rotated by the driving force transmitted from the motor 13.

At this time, however, if the film feeding speed and the film winding speed are not properly preset, then the rotation of the fork gear 10 causes excessive feed of the film 1 in the film magazine 2 when the film feeding mode is shifted to the film winding mode, or unstable film feeding speed may result, making it impossible to accomplish stable magnetic recording on the magnetic information recording area on the film surface.

It is necessary to set a specific proper value for the film feeding speed in order to ensure stable magnetic recording in the magnetic information recording area. The applicant has carried out the following experiment to set the specific proper value for the film feeding speed.

Firstly, the maximum diameter of the film wound around the core of the film magazine which is loaded in the camera and which has the feeding function according to the present embodiment is decided by the diameter of the core of the film winding shaft and the number of frames of the film; therefore, the dimension between the outside diameter of the film magazine and the core diameter of the film winding shaft ranges from approximately $\Phi 15$ mm to $\Phi 17.5$ mm.

The diameter of the motor which is incorporated in a film spool is typically $\Phi 10$ mm to $\Phi 12$ mm; therefore, the diameter of the film spool shaft is normally set to $\Phi 13.5$ mm to $\Phi 15.5$ mm.

To test the magnetic recording, the diameter of the film winding shaft was set to $\Phi 17.5$ mm, the diameter of the film spool shaft was set to $\Phi 15.5$ mm, and Value (K) of (Feeding reduction ratio)/(Winding reduction ratio) was set to K=1.8, K=2.6, respectively.

When the film was fed with K set to 2.6, a successful magnetic recording result was obtained without any problem and has well cleared the acceptable level.

When the film was fed with K set to 1.8, the magnetic recording result barely passed the acceptable level.

From the experiment results described above, when the diameter of the film spool shaft is set to the minimum value $\Phi 13.5$ mm, the value (K) of (Feeding reduction ratio)/(Winding reduction ratio) is predicted as:

K=2 from K=15.5/13.5×1.8

It has been found that the value (K) of (Feeding reduction ratio)/(Winding reduction ratio) should be set as follows:

$2 \leq K$

With this value of K, it has been found that smooth switching from the film feeding mode to the film winding mode can be achieved to ensure successful automatic loading by winding the film around a film spool shaft of Φ13.5 mm to Φ15.5 mm.

Thus, in the embodiment, the gear ratios of the respective gears are so set that the film spool shaft 12 rotates at least twice as fast as the film winding shaft 2a which feeds the film 1. The seventh transmitting gear 40 engaged with the fork gear 10 rotates in the direction of the arrow.

Figure 11:
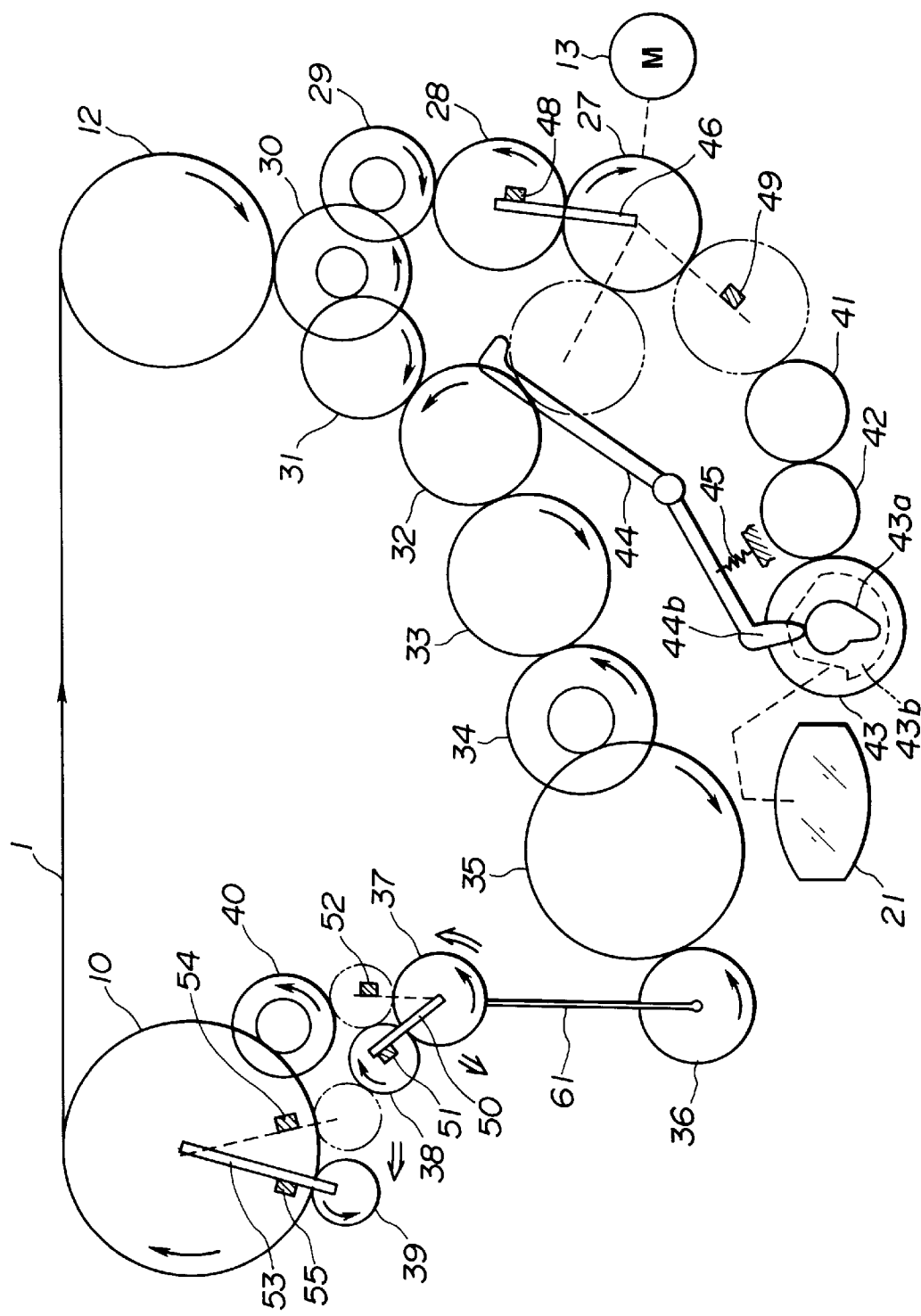

Referring now to FIG. 11, the winding of the film will be described.

From the state described above, the winding of the film 1 is started, and the film 1 is wound around the film spool shaft 12 which has been set to rotate at a speed of at least double the speed of the film winding shaft 2a by setting the relationship between the feeding reduction ratio and the winding reduction ratio to $2 \leq K$.

Thus, the film 1 is pulled by the film spool shaft 12 and the fork gear 10 starts to rotate at a higher speed than the speed during the feeding, causing the fork gear 10 to drive the planetary gear 39. In other words, the fork gear 10 turns into the second sun gear for the second planetary gear 39, thereby switching the film feeding mode to the film winding mode.

As soon as the fork gear 10 turns into the sun gear, the second planetary gear 39 meshing with the fork gear 10 starts to revolve clockwise. The second gear arm 53 connected to the second planetary gear 39 moves from a stopper 54 to come in contact with a stopper 55 to release the engagement between the transmitting planetary gear 38 and the second planetary gear 39, thereby preventing the driving force of the motor 13 from being transmitted to the fork gear 10 via the transmitting planetary gear 38 and the second planetary gear 39. Thus, the driving force of the motor 13 is transmitted only to the film spool shaft 12 to wind the film to set the first frame of the film 1 ready for photographing.

Thus, the film which has been fed out of the film magazine is wound around the film spool shaft which has been set to rotate at least twice as fast as the film winding shaft, so that the film, which has been fed out of the film magazine, is pulled by the film spool shaft to cause the fork gear engaged with the film winding shaft to drive the film feeding planetary gear.

The driving force of the motor is used to feed the film by engaging the first planetary gear of the first planetary gear mechanism with the second planetary gear of the second planetary gear mechanism; once the film reaches the film spool shaft and winds around it, the fork gear constituting the second planetary gear mechanism is turned into the driving sun gear to revolve the second planetary gear clockwise so as to release the engagement between the second planetary gear and the first planetary gear.

Then, the film feeding planetary gear meshing with the fork gear revolves to release the mesh between the film feeding planetary gear and the transmitting planetary gear, thus permitting smooth shift from the film feeding mode to the film winding mode.

Further, the driving force can be efficiently transmitted only to the film spool shaft to wind the film by interrupting the transmission of the driving force of the motor to the first planetary gear mechanism and the second planetary gear mechanism which feeds the film, without the need of rotating the fork gear of the second planetary gear mechanism. This reduces the current consumed by the motor for winding the film and also prevents excessive feed of the film caused by the rotation of the film winding shaft, thus ensuring a constant film feeding speed which allows stable magnetic recording onto magnetic tracks.

Figure 12:
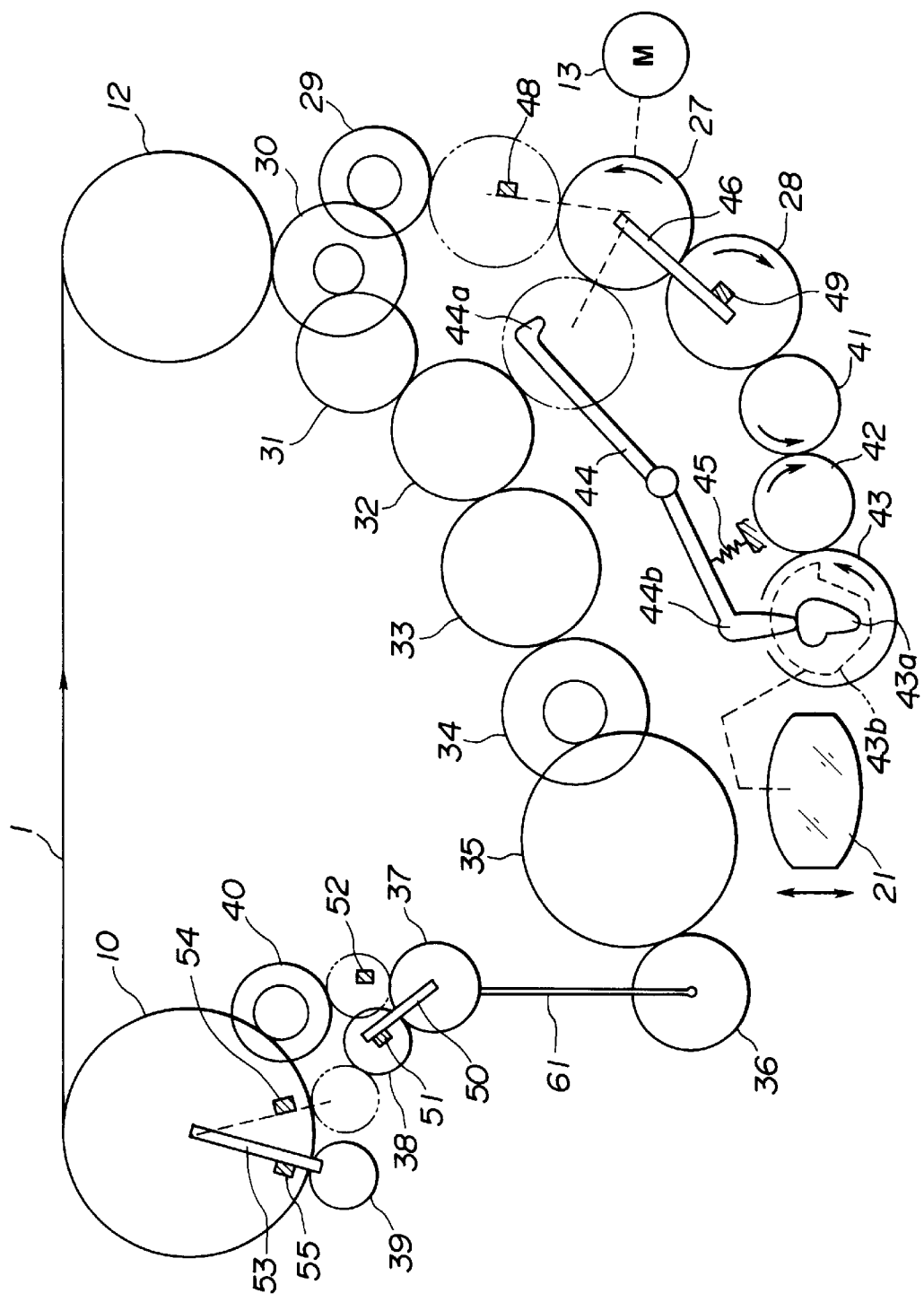

Referring now to FIG. 12, the lens drive will be described.

As shown in the drawing, to take a picture on the film 1 which has been set in a predetermined position, the photograph lens 21 moves to perform autofocusing. At this time, the motor 13 runs in the reverse direction. When the motor 13 runs in the reverse direction, t he clutch planetary gear 28 revolves counterclockwise around the clutch sun gear 27 to hold the clutch gear arm 46 against a stopper 49 so as to engage the clutch planetary gear 28 with the first LD transmitting gear 41.

This causes the driving force of the motor 13 to be transmitted to the clutch sun gear 27 and the clutch planetary gear 28 to rotate the first LD transmitting gear 41 and the second LD transmitting gear 42 in the direction of the arrow so as to rotate the LD cam gear 43 in the direction of the arrow. This in turn causes the LD cam 43b, which is an integral part of the LD cam gear 43, to rotate, and a focusing lever (not shown) held against the LD cam 43b moves the photograph lens 21 to a desired position, then a shutter (not shown) is actuated for exposure and the film is wound by one frame.

When the film 1 is wound by one frame after photographing, the arm stopper 44 interlocked with the arm stopper cam 43a of the LD cam gear 43 will have been withdrawn. As described in conjunction with FIG. 11, the motor 13 is rotated in the forward direction again to revolve the clutch planetary gear 28 around the clutch sun gear 27 to bring the clutch gear arm 46 into contact with the fixed stopper 48 so as to engage the clutch planetary gear 28 with the first gear 29, thereby winding the film 1.

At this time, the film 1 is positioned by the PR 7 and the perforation detecting circuit 14 so that it stops with the second frame set in a predetermined position for the next photographing. While the film is being wound, the photographic information of the first frame is recorded onto the magnetic track 4 by the magnetic head 8. The magnetic recording is performed by generating timing pulses by the film-driven roller 9, which rotates as the film 1 moves and generates pulses, and the PI 11.

Thus, the LD cam gear which moves the focusing lever which in turn moves the photograph lens can be rotated by running the motor in the reverse direction to revolve the clutch planetary gear of the clutch planetary gear mechanism to engage the LD gear train with the first LD transmitting gear.

Figure 13:
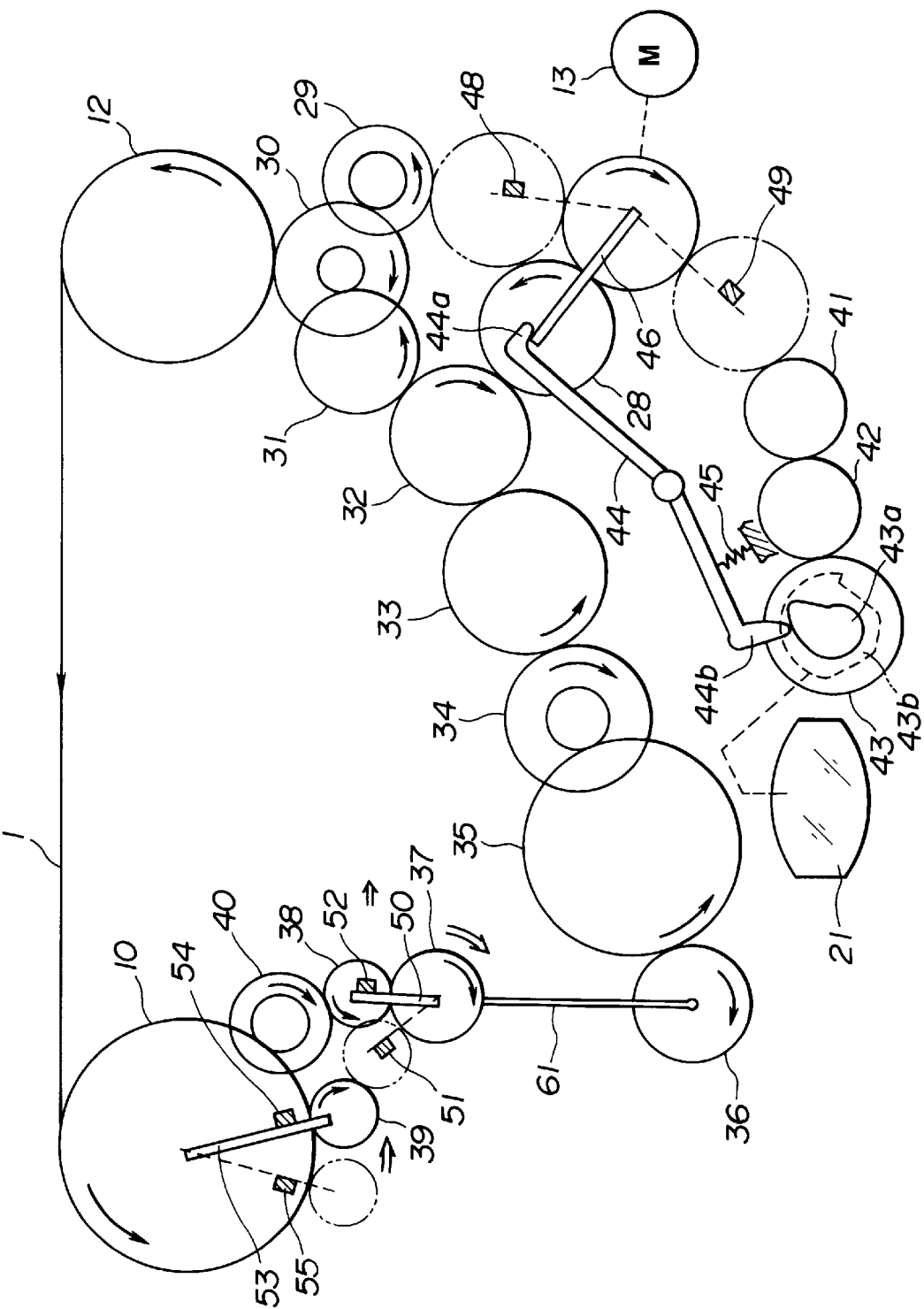

The rewinding of the film will now be described in conjunction with FIG. 13.

The film 1 is rewound upon completion of one-frame film photographing and before completion of one-frame film photographing. A film rewinding switch (not shown) which is provided on the camera 25 is operated to specify the rewinding of the film 1. This switches the LD cam gear 43 first.

The LD gear 43 is switched by running the motor 13 in the reverse direction as in the case of the lens drive described with reference to FIG. 12. Running the motor 13 in the reverse direction causes the clutch planetary gear 28 to mesh with the first LD transmitting gear 41, so that the first LD transmitting gear 41 and the second LD transmitting gear 42 are rotated to drive the LD cam gear 43 to the rewinding position. As soon as the LD cam gear 43 reaches the rewinding position, the arm stopper cam 43a of the LD cam gear 43 brings an arm stopper sliding section 44b of the arm stopper 44 in contact with the LD cam gear 43 by the urging force of an arm stopper spring 45. This moves the arm locking section 44a to a position where it restricts the movement of the clutch gear arm 46 as illustrated in FIG. 13.

When the LD cam gear 43 reaches the rewinding position, the LD cam switches 47a and 47b issue the signal indicating that the LD cam gear 43 has been set in the rewinding position, and the motor 13 runs in the forward direction as in the feeding and winding mode. Hence, the clutch planetary gear 28 revolves clockwise around the clutch sun gear 27, the clutch gear arm 46 comes in contact with the arm locking section 44a to stop the revolution, and the clutch planetary gear 28 meshes with the first transmitting gear 32.

Thus, despite the fact that the motor 13 runs in the same direction in the feeding and winding mode and also in the rewinding mode, the first transmitting gear 32 rotates in the opposite direction from that in the feeding and winding mode.

The rotation of the first transmitting gear 32 is transmitted to the film spool shaft 12 via the WR idler 31 and the second gear 30, causing the film spool shaft 12 to rotate counterclockwise.

The rotation of the first transmitting gear 32 is transmitted to the second transmitting gear 33, the third transmitting gear 34, the fourth transmitting gear 35, the fifth transmitting gear 36, the coupling shaft 61, and the transmitting sun gear 37 to revolve the transmitting planetary gear 38 to hold the first gear arm 50 against a fixed stopper 52, and the transmitting planetary gear 38 and the seventh transmitting gear 40 are engaged to rotate the fork gear 10 constituting the second planetary gear mechanism in the direction of the arrow which is opposite from that in the feeding and winding, thereby rotating the film winding shaft 2a counterclockwise.

The driving force is transmitted in different routes depending on whether the film is fed and wound or the film is rewound. The gear ratios of the gears are so set that the film spool shaft 12 rotates faster than the film winding shaft 2a which rewinds the film 1. Further, the speed of the forward rotation and the speed of the reverse rotation of the film spool shaft can be changed by setting an appropriate gear ratio of the first gear 29 and the WR idler 31 engaged with the second gear 30 which transmits the driving force of the motor 13 to the film spool shaft 12.

Accordingly, at the time of film winding, as the film spool shaft 12 rotates faster than the film winding shaft 2a, the close contact between the film 1, which has been tightly wound around the film spool shaft 12, and the film spool shaft 12 is released, so that the wound film 1 becomes loose when it is rewound onto the film winding shaft 2a in the film magazine 2. When the film 1 has completely been rewound, the film magazine 2 can be taken out of the camera 25.

Figure 10:
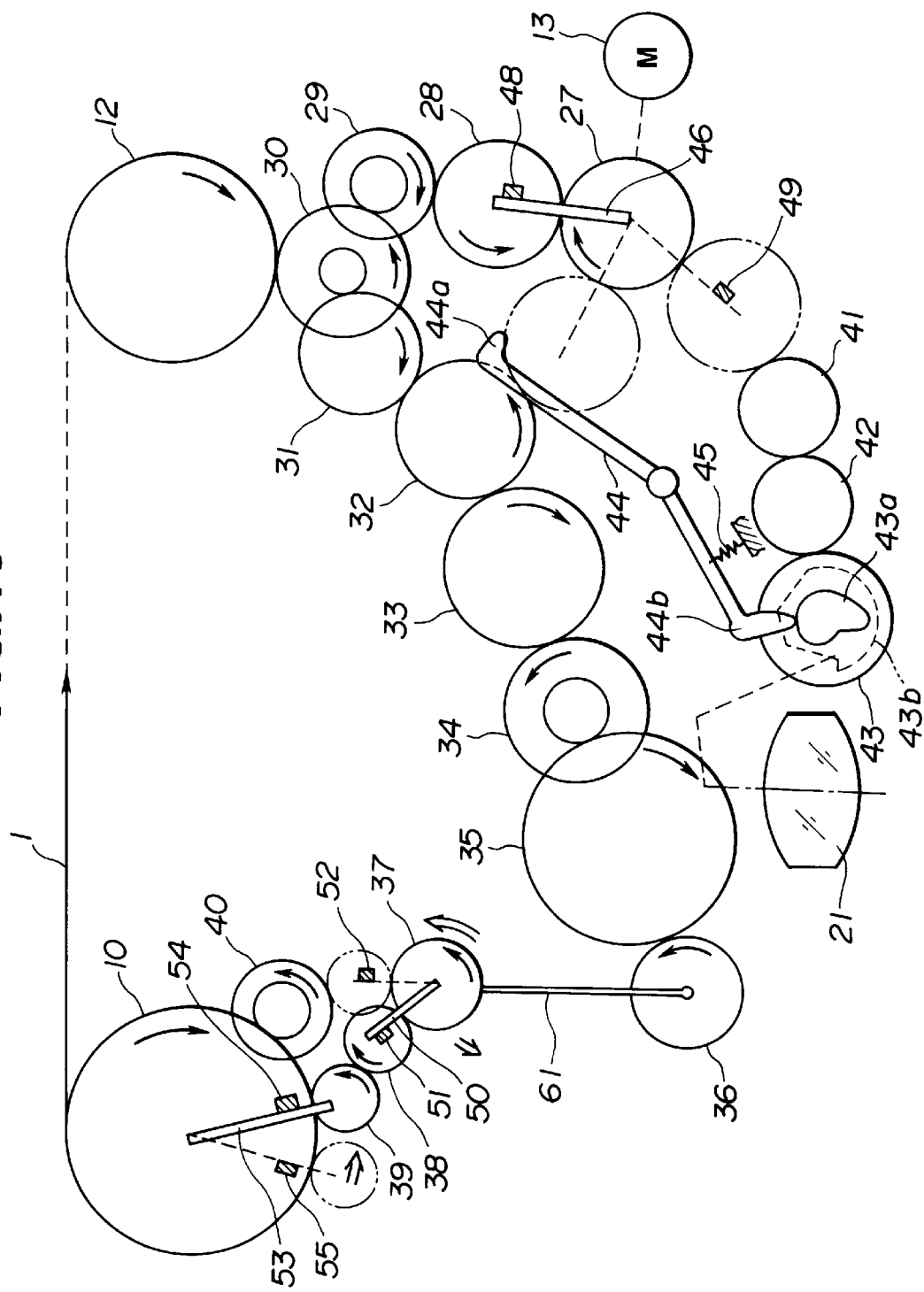

The second planetary gear 39 revolves counterclockwise around the fork gear 10 to go back to the feeding home position shown in FIG. 10, therefore, it is immediately ready for feeding film when a new film magazine is loaded.

Thus, the clutch planetary gear, which revolves by meshing with the clutch sun gear directly rotated by the driving force of the motor, is engaged with the first transmitting gear to rotate the first transmitting gear in the opposite direction from that in the film feeding and winding mode so as to rotate the film spool shaft and the film winding shaft in the reverse direction, thus enabling the film to be rewound.

After the motor is run in the reverse direction to switch the LD cam gear, the motor is run in the forward direction to revolve the first planetary gear in order to engage the first planetary gear with the seventh transmitting gear, thereby enabling the fork gear constituting the second planetary gear mechanism to rotate in the opposite direction from that in the film feeding and winding mode.

Furthermore, when the fork gear is rotated in the reverse direction, the film spool shaft is rotated in the opposite direction from that in the film feeding and winding mode so as to loosen the film wound on the film spool shaft to rewind the film back into the film magazine. This reduces the load applied to the film when the film is rewound.

Moreover, since the gear ratio of the transmitting gear train is set so that the rotational speed of the film spool shaft is higher than the rotational speed of the film winding shaft, it is possible to make the film wound on the film spool shaft loose when winding the film. This reduces the load applied to the film when the film is rewound.

Since the transmitting route of the driving force in the film feeding and winding mode is different from that in the film rewinding mode, the speed of the forward rotation and the speed of the reverse rotation can be changed as desired by setting an appropriate gear ratio of the first gear and the WR idler engaged with the second gear which transmits the driving force of the motor to the film spool shaft. This adds to the freedom of design.

Since the second planetary gear is reset to the home position as described above at the time of film rewinding, the film can be smoothly fed as soon as a new film magazine is loaded.

It is obvious that the present invention may be embodied in other specific forms without departing from the spirit or essential characteristics thereof. The present invention is not restricted by any specific embodiment except as may be limited by the appended claims.

What is claimed is:

1. A film feeder for a camera comprising:

a winding shaft driving mechanism which rotates a film winding shaft, around which a film is wound, in a film magazine in one direction so as to feed the film out of the film magazine at a time of winding and which rotates the film winding shaft in an opposite direction so as to rewind the film back into the film magazine at a time of rewinding; and a film spool shaft driving mechanism which rotates a film spool shaft in one direction to wind said film, that has been fed, at the time of winding and which rotates the film spool shaft in the opposite direction to send the film back into the film magazine at the time of rewinding;

wherein said film spool shaft rotates faster than said winding shaft at the time of rewinding.

2. A film feeder for a camera comprising:

a winding shaft driving mechanism which rotates a film winding shaft, around which a film has been wound, in a film magazine in one direction so as to feed the film out of the film magazine at a time of winding and which rotates the film winding shaft in an opposite direction so as to rewind the film at a time of rewinding; and a film spool shaft driving mechanism which rotates a film spool shaft in one direction to wind said film, that has been fed, at the time of winding and which rotates the film spool shaft in the opposite direction to send the film back into the film magazine at the time of rewinding;

wherein the relative driving speeds of said winding shaft driving mechanism and said film spool shaft driving mechanism are set so that a speed of winding the film becomes at least twice as high as a speed of feeding the film at the time of winding, while a rotational speed of said film spool shaft becomes higher than a rotational speed of said winding shaft at the time of rewinding.

3. A film feeder for a camera comprising:

a winding shaft driving mechanism which rotates a film winding shaft, around which a film has been wound, in a film magazine to feed the film out of the film magazine; and a film spool shaft driving mechanism which rotates a film spool shaft to wind the film which as been fed; wherein (a) said winding shaft driving mechanism includes;

a first planetary gear mechanism composed of a first sun gear which is driven so that it rotates in a different direction at a time of winding from that at a time of rewinding, and a first planetary gear which revolves around said first sun gear, a second planetary gear mechanism composed of a second sun gear connected to the film winding shaft provided in the film magazine, and a second planetary gear which revolves around said second sun gear, and a gear train which connects said first sun gear with said rotational driving source, said first planetary gear and said second planetary gear being engaged when the film is fed and disengaged when the film is wound by the film spool shaft;

(b) said film spool shaft driving mechanism includes;

a third planetary gear mechanism composed of a third sun gear which is a part of said gear train and which is driven by the rotational driving source and a third planetary gear which revolves around said third sun gear, and a driving gear which rotates the film spool shaft by receiving the output from said third planetary gear;

said film spool shaft driving mechanism driving the film spool shaft such that it winds the film at a speed which is higher than a rotational speed of said film winding shaft; and wherein the first planetary gear and the second planetary gear are disengaged when said second planetary gear revolves in a direction such that it disengages from said first planetary gear due to a difference in rotational speed between the film spool shaft and the winding shaft.

4. A camera provided with a film feeder which feeds a film out of a film cartridge by rotating a spool in the film cartridge and which rewinds the film into the cartridge, said camera comprising:

a single driving source;

a driving shaft for driving a winding shaft for feeding the film;

a film spool shaft for rewinding the film; and a gear train which receives driving force from said driving source to drive the driving shaft for driving the winding shaft and the film spool shaft at the same time;

wherein said gear train is so configured that a gear ratio between the driving source and the film spool shaft is smaller than a gear ratio between the driving source and the driving shaft for driving the winding shaft; and said gear train includes two planetary gears arranged in series for driving the driving shaft for driving the winding shaft, and the planetary gears mesh with each other to rotate so as to transmit said driving force to the driving shaft for driving said winding shaft when feeding said film, while the planetary gears are disengaged once said film reaches and winds around the driving shaft.

5. A camera provided with a film feeder according to claim 4, wherein said two planetary gears each respectively mesh with an associated sun gear constituting a part of said gear train.

6. A camera provided with a film feeder according to claim 5, wherein the gear ratio between said driving source and said driving shaft for driving the winding shaft is set at least twice as large as the gear ratio between said driving source and said film spool shaft.

7. A film feeder for a camera which feeds a film out of a film magazine and rewinds the film into the film magazine, said film feeder comprising:

a first planetary gear mechanism composed of a first sun gear which is driven so that it rotates in a different direction at a time of film winding from that at a time of film rewinding, and a first planetary gear which revolves around said first sun gear;

a second planetary gear mechanism composed of a second sun gear connected to a film winding shaft provided in the film magazine, and a second planetary gear which revolves around said second sun gear, and a film spool shaft which is driven by a driving source such that it rotates faster than said film winding shaft to wind the film which has been fed out of said film magazine;

wherein said first planetary gear and said second planetary gear are engaged to feed the film, and once the film reaches and winds around said film spool shaft, said second planetary gear is revolved in a direction such that it is disengaged form said first planetary gear due to a difference in rotational speed between said film spool shaft and said film winding shaft.

8. A film feeder for a camera according to claim 7, wherein, when the film is rewound, said second planetary gear has been reset to a home position for feeding the film.

9. A film feeder for a camera according to claim 7, wherein said second sun gear is directly connected to the film winding shaft provided in the film magazine.

10. A film feeder for a camera comprising:

a film feeding mechanism which transmits a driving force of a driving source to a film winding shaft, around which a film with a magnetic information recording section has been wound, in a film magazine to rotate the film winding shaft so as to feed the film out of the film magazine at a first speed;

a film winding mechanism which transmits the driving force of the driving source to a film spool shaft provided on the camera and which winds the film, that has been fed out of said film magazine, around said film spool shaft at a second speed which is higher than the first speed; and magnetic recording means having a magnetic head disposed in a film feeding passage between said film winding shaft and said film spool shaft and which performs magnetic recording on the magnetic information recording section on a surface of said film by the magnetic head;

wherein the second speed is at least twice the first speed of said film feeding mechanism so that a feeding speed of said film passing said magnetic head reaches said second speed during magnetic information recording.

\* \* \* \* \*